Dec. 28, 1937. C. H. KOEHLER Re. 20,608

ELECTRICAL CONTACT DEVICE

Original Filed May 5, 1934

Inventor
Charles H. Koehler
By Brown, Jackson, Boettcher & Dienner
Attys

Reissued Dec. 28, 1937

Re. 20,608

UNITED STATES PATENT OFFICE 20,608

ELECTRICAL CONTACT DEVICE

Charles H. Koehler, Oak Park, Ill.

Original No. 2,086,424, dated July 6, 1937, Serial No. 724,118, May 5, 1934. Application for reissue August 16, 1937, Serial No. 159,442

21 Claims. (Cl. 173—332)

This invention relates to electrical contact devices, and is more particularly directed to a plug and receptacle connecter which may be used for connecting and disconnecting an electrical circuit.

In connecting devices of the type in which a multi-contact receptacle is mounted in fixed position, such as on an instrument board, panel, or the like, and comprises a plurality of plug-receiving or socket members disposed in insulated spaced relationship thereon, the problem of providing a unit having self-adjusting and aligning characteristics, whereby a corresponding plurality of spaced contact plugs mounted in fixed position upon a base or carrier member may be engaged simultaneously in the receptacle sockets without the necessity of extremely accurate individual alignment therebetween, presents considerable difficulty.

For example, in the use of a disconnecting device for an oil circuit breaker or the like, wherein a plurality of contacts must be engaged and disengaged, and wherein spacial requirements demand a compact but sturdy unit, the present invention finds particular application. This unit is provided in such an installation to effect connecting and disconnecting of the secondary or control wiring for the breaker, and, since it is mounted, ordinarily, on the side walls of the breaker compartment, it must be compact in design to eliminate, to as great an extent as possible, any interference with the installation and removal of the breaker from the compartment. Further, this control wiring ordinarily includes the trip coil circuit for the breaker, and a high grade, efficient contact device is thus necessary. Also, because of its self-aligning characteristics, the present invention is capable of being employed in connection with the terminals of the circuit breakers themselves, since the sockets or terminals of these breakers must be self-adjusting and capable of maintaining equalized contact pressure upon the male contact plugs with which the breaker terminals are engaged when the breaker is moved into operative position. It is to be understood, however, that the invention is not to be limited to these specific uses, since the broad features thereof are applicable in various other fields.

The present invention, in its preferred embodiment, comprises a pair of contact shoes having a ball and socket engagement with a terminal stud, and being enclosed within a floating housing. The contact shoes are urged toward each other and into pressure contacting engagement with the terminal studs by means of a pair of spring members biased between the outer surfaces of the shoes and the housing. The outer or free ends of the shoes are formed to guide the contact tip of a male contact plug into engagement therebetween, and the housing is adapted to extend slightly beyond the peripheral limit of the shoes to enclose fully the entire contact device.

An important object attained by the present invention is the maintenance of equal pressure between both shoes and the contact tips of the plug and terminal, these contact tips and the inner contact surfaces of the shoes being optionally silver-plated to provide a low resistance and positive current-conducting path through the contact device. This equalization of pressure is obtained by the provision of the full-floating housing enclosing the contact shoes and biasing the outer ends of the springs, which bear, at their inner ends, against the contact shoes. Since the housing is capable of floating movement, both the contact shoes and housing are movable about the ball contact tip of the terminal stud, and consequently the contact shoes are self-aligning with respect to a male contact plug, due to this universal joint connection.

An additional object of the present invention is the elimination of the spring means from any part of the electrical circuit through the contact device, whereby the life of the springs is measurably increased.

Other objects and advantages of the present invention, such as the compactness and simplicity of design of the contact device, and its manner of assembly in a multi-point disconnecting unit, will appear more fully from the following detailed description which, taken in conjunction with the accompanying drawing, will disclose to those skilled in the art the particular construction and operation of a preferred form of my invention.

Figure 1:
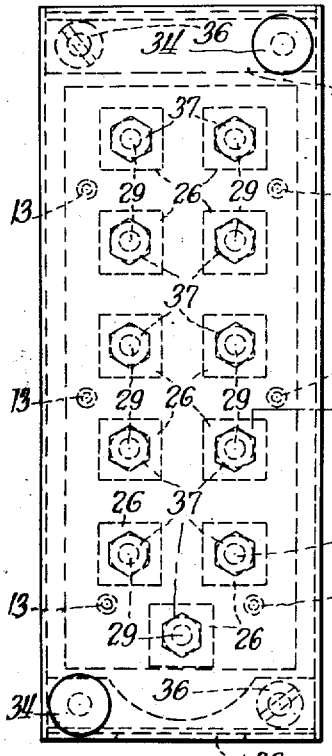
Figure 1 is an end elevational view of a disconnect unit employing the present invention.
Figure 2:
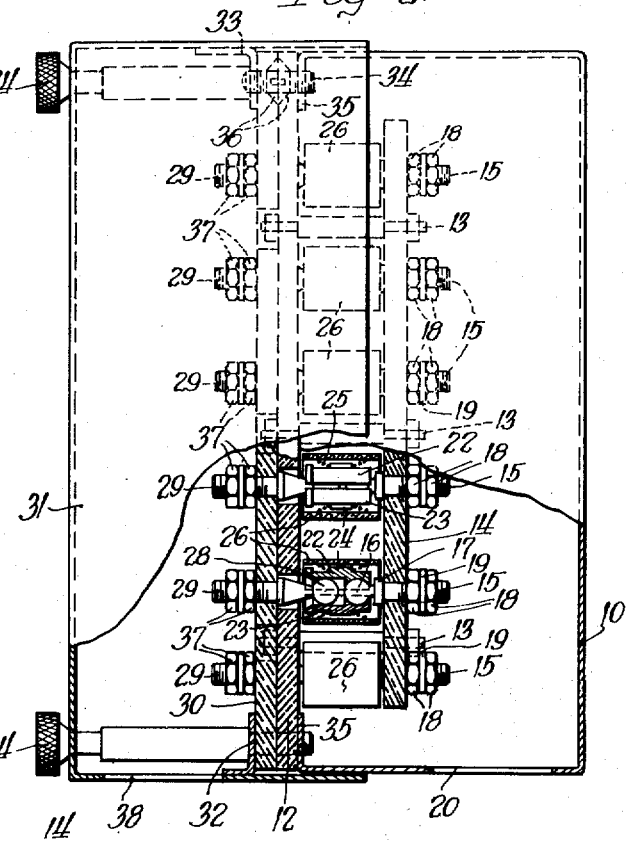
Figure 2 is a side elevational view of the unit shown in Figure 1, with a portion thereof broken away to show in detail the construction of the contact device.
Figure 3:
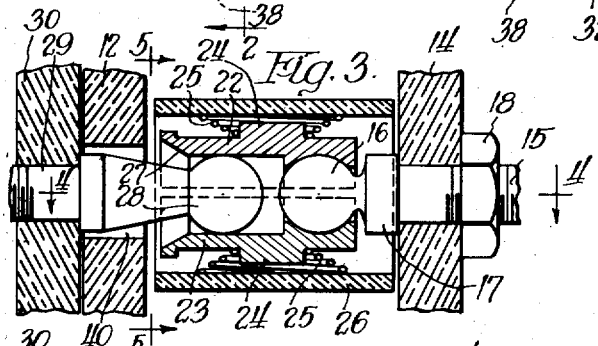
Figure 3 is an enlarged vertical sectional view of the contact device shown in Figure 2.
Figure 4:
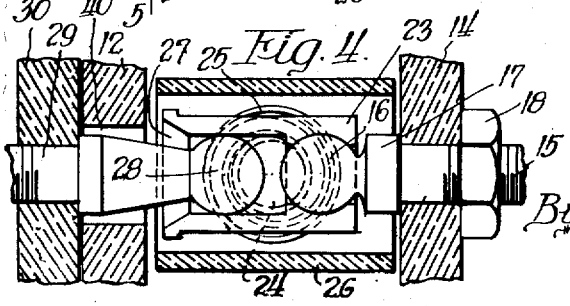
Figure 4 is a sectional view of the contact device, taken substantially on the line 4—4 of Figure 3.

Referring now in detail to Figures 1 and 2, I have shown a receptacle unit, indicated generally by the reference numeral 10, and having a substantially box-like construction terminating in an open facing portion, to which is secured an insulating panel member 12. The panel member 12 closes the receptacle housing 10 and, in addition, is provided with a plurality of stud or pillar members indicated at 13, secured to the panel 12 and extending rearwardly therefrom to support a second insulating panel 14 thereon. I preferably provide six of these pillars 13, in order to provide adequate support for the secondary panel 14, the pillars being provided with spacing bushings for maintaining the secondary panel 14 in spaced relation to the closure panel 12.

Mounted upon the secondary panel 14 are a plurality of terminal studs, indicated at 15, which extend through the panel and have ball contact tip portions, indicated at 16, and rearwardly extending collar portions 17 abutting against one face of the panel 14. A plurality of nuts 18 are threaded onto each of the studs 15 for securing the same in position upon the panel 14, there being a washer 19 interposed therebetween. The nuts 18, with the washer 19, form securing means for the terminal ends of a plurality of conductors extending into the receptacle housing 10 through the opening 20 at the base thereof. These conductors are selectively connected to the various terminal studs 15 within the receptacle housing 10.

Figure 5:
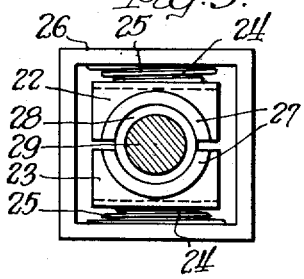
Figure 5 is an end view of the contact device and housing, taken substantially on the line 5—5 of Figure 3.

As shown, I have indicated eleven of such contact or terminal studs, although it is obvious that any desired number of studs may be employed and arranged symmetrically within the housing. Mounted over the ball contact tip 16 of the plug 15 is a pair of contact shoes 22 and 23, which are preferably formed of forged copper and which are suitably recessed to engage about the contact tip 16 and to have universal ball and socket connection therewith. The contact shoes 22 and 23 are provided with a raised centrally located boss portion 24, which is adapted to serve as a seat for one end of a spring member 25, the opposite ends of the spring members 25 being biased against the inner periphery of a housing 26 which has floating engagement therewith, the housing 26 being substantially rectangular in shape, as shown clearly in Figure 5, and being of a length so that it extends from the shoulder portion 17 of the stud 15 to a point slightly forwardly of the forward ends of the shoes 22 and 23, thereby completely enclosing the contact device. The housing 26 may be formed of insulating material, as shown, if desired.

The outer ends of the shoes 22 and 23 are beveled outwardly, as shown at 27, and are adapted to guide the ball contact tip 28 of a male contact plug or stud 29 into engagement between the shoes 22 and 23. Preferably, the ball contact tip 28, the terminal contact tip 16, and the inner contacting surfaces of the shoe members 22 and 23 are silver-plated, in order to provide a low resistance contact between these members, and current is transmitted through a path including the contact shoes and the ball contact tips 16 and 28, thereby preventing any electrical current from passing through the springs 25, which measurably increases the life of these springs and allows them to retain their resiliency for a greater period of time, due to the fact that they are not heated by any electric current passing therethrough.

The male contact plugs 29 are carried by an insulating base member 30, which member forms a closure for one face of the plug housing 31. This housing is preferably formed of metal, and is provided with laterally extending flange portions 32 and 33 adapted to receive a pair of diagonally disposed attaching studs 34 having enlarged knurled ends and which extend through the housing 31, through the insulating base or closure member 30, through the insulating member 12, and are threaded into corresponding flanged portions 35 of the receptacle housing 10. A pair of countersunk screws 36 are threaded into the flanges 35 to secure the base member 12 in abutting engagement with the flanges. A second pair of countersunk screws 36 are threaded into flanges 32 and 33 opposite the stud openings extending therethrough for securing base member 30 to the flanges 32 and 33. The housing 31 may thus be secured in position over and telescoping with the housing 10, and simultaneously the contact plugs 29 carried by member 30 are engaged within the contact shoes 22 and 23. The contact studs 29 are adapted to carry a plurality of nuts 37 threaded onto the projecting ends thereof, these nuts serving to secure conductors to the contact plugs 29, the conductors entering into the housing 31 through an opening 38 formed in the base thereof.

In the particular type of disconnect unit shown, there are provided eleven contact devices and a corresponding number of contact plugs 29, the plugs 29 being spaced with respect to the base member 30 in the same position as the contact devices, and terminal studs 15 are spaced with respect to the supporting member 14. Thus, upon telescoping engagement of the housing 31 with the housing 10, the plugs are forced through enlarged openings 40 formed in the closure member 12, and enter the beveled edges 27 of the contact shoes 22 and 23 and are thereby guided into pressure engagement between the contact shoes. Due to the fact that the contact shoes have universal movement with respect to the ball contact tip 16 of the terminal plug 15, and due to the fact that the housing 26 has full floating movement with respect to the terminal plug, any slight misalignment between the studs 15 and 29 can be accommodated by a corresponding movement of the shoes about the ball and socket joints at the ball contact tips 16. Further, equal pressure will be maintained, due to the fact that the springs are biased between the shoes and the floating housing, so that upon movement of the shoes the housing moves therewith, and the spring pressure is maintained equally upon both of the shoes.

It is obvious that the invention is equally applicable for other uses, such as for use in connection with circuit breakers, where the contact plugs 29 may comprise the fixed terminals in the switch gear structure, with the contact devices including the shoes 22 and 23, having insulating housing 26 thereabout, comprising the socket terminals carried by the breaker, which are engaged about the plugs when the breaker is moved into position.

Further, it is apparent that in place of two contact shoes 22 and 23, any desired number of contact shoes may be provided, the housing 26 in such instance being formed to take the shape of the outer periphery of the contact device, and a plurality of spring means corresponding to the number of shoes employed being biased between the shoes and the housing.

It is thus apparent that I have provided an electrical contact device which provides for self-alignment and self-adjustment between the two contact portions thereof, and provides for maintaining equal pressure throughout the contact device, and which may be employed in any situation requiring the engagement of a fixed male contact plug member within a socket of a contact device, the socket being universally movable to accommodate inaccuracies in alignment between the two contact members.

Having described my invention in accordance with the patent statutes, what I claim as new and desire to secure by Letters Patent is:

1. An electrical contact device comprising a terminal stud having a ball contact tip, a plurality of contact shoes recessed to have ball and socket engagement about said tip and defining a cylindrical opening extending outwardly of said top, an enclosing housing supported about said shoes, spring means biased against said housing and said shoes, and a male contact plug engageable within the opening formed by said shoes, said spring means equalizing the pressure between each of said shoes and said contact tip and contact plug.

2. An electrical contact device comprising a plurality of contact shoes having universal movement about a fixed ball contact member and defining a plug receiving opening, a plug member having a contact portion engageable within said opening, a housing of the same inner peripheral shape as the outer defining periphery of said contact shoes and enclosing the same, and spring means biased against said shoes and said housing supporting said housing for conjoint movement with said shoes and normally urging said shoes inwardly for equalizing the contact pressure of said shoes.

3. An electrical contact device comprising a plurality of cooperating contact shoes interiorly recessed at one end thereof to define a socket opening, a ball contact member engaged within said socket opening and providing for universal movement of said contact device thereabout, an enclosing housing about said shoes, spring means bearing against said shoes and said housing to support said housing in position for conjoint movement of said housing upon movement of said shoes and normally urging said shoes inwardly of said housing about said member, and means at the opposite ends of said shoes for guiding a contact plug into engagement therebetween.

4. An electrical contact device comprising a ball contact stud member, a plurality of contact shoes having cooperating recessed portions at one end engaging about said stud for universal movement thereabout, the inner surfaces of said shoes defining a cylindrical opening for receiving a contact plug, a housing extending about said shoes, and spring means biased between the outer surface of each of said shoes and the inner surface of said housing normally urging said shoes inwardly, said housing having free floating support upon said shoes.

5. In combination, an insulating supporting member, a plurality of terminal studs extending therethrough and having projecting ball contact tip portions, contact devices engaging about each of said contact tip portions, each of said contact devices comprising a plurality of cooperating contact shoes having ball and socket engagement with said tip portions, an open-ended housing disposed about said contact shoes, spring means biased between each of said plurality of shoes and said housing for supporting said housing thereon, and a plurality of contact plugs mounted in fixed position on a supporting member and engageable within the corresponding contact device, said spring means equalizing the pressure contact between said shoes and said plug.

6. In combination, an insulating supporting member, a plurality of terminal studs extending therethrough and having projecting ball contact tip portions, contact devices engaging about each of said contact tip portions, each of said contact devices comprising a plurality of cooperating contact shoes having ball and socket engagement with said tip portions, an open-ended housing disposed about said contact shoes, and spring means biased between each of said plurality of shoes and said housing for supporting said housing thereon; and a plurality of contact plugs mounted in fixed position on a supporting member and engageable within the corresponding contact device, said ball and socket engagement providing for individual aligning of said contact devices with said plugs.

7. In combination, a contact plug having a ball contact portion, a contacting device adapted to receive said plug comprising a terminal stud having a ball contact portion, contact means engaged thereabout for universal movement with respect thereto and defining an expansible and contractible opening for receiving the contact portion of said plug, enclosing housing means disposed about said contact means, and spring means biased between said housing means and said contact means.

8. In an electric contact device, a plurality of cooperating contact shoes defining a plug-receiving opening, a contact tip projecting from a fixed suport and having a rounded contact surface engaged by said shoes and supporting said shoes for universal movement thereabout, an open-ended enclosing housing for said shoes and fitting thereabout, spring means biased between each of said shoes and the inner surface of said housing, and a contact plug adapted to be inserted into said plug-receiving opening, said shoes and housing being shiftable about said tip to accommodate axial misalignment between said plug and said tip.

9. In combination, a supporting member, a contact tip extending therethrough and having a spherical contact portion, a plurality of contact shoes defining a plug-receiving opening and having concave spherical contact surfaces for cooperating with said spherical contact portion to permit limited universal movement about the contact portion of said tip, a second supporting member mounted in spaced parallel alignment with said first supporting member and having an insulated opening substantially aligned with said plug-receiving opening, a contact plug adapted to be inserted through said insulating opening and engageable within said plug-receiving opening, and means for resiliently urging said shoes into contacting engagement with said contact tip and said contact plug.

10. In combination, a ball contact tip, a plurality of contact shoes recessed to receive said tip and having universal movement thereabout, said shoes having means defining a socket for receiving a male contact plug, a sleeve member extending laterally about said shoes and having a sufficient opening at its ends for receiving said ball contact tip and said male contact plug, and spring means engaging said sleeve member and the outer surface of said shoes for urging said shoes inwardly against said tip and plug.

11. In combination, a ball contact tip projecting outwardly from a fixed support, a plurality of shoes having means formed in one end thereof for mounting said shoes for universal movement about said tip, said shoes defining at their opposite ends a socket for receiving a male contact plug, supporting means resiliently carried by said shoes and movable therewith about said tip, and spring means biased between said shoes and said supporting means for urging said shoes toward each other, said supporting means and shoes being automatically moved about said tip upon insertion of a male contact plug thereinto for accommodating misalignment between said tip and plug.

12. An electrical contact device for connecting a male contact plug to a fixed contact terminal comprising a plurality of contact shoes defining a cylindrical plug-receiving socket at one end thereof, means at the opposite end of said shoes mounting said shoes for universal movement about said fixed terminal, a sleeve enclosing said shoes and terminating adjacent the ends thereof, and spring means biased between the interior surfaces of said sleeve and the exterior surfaces of said shoes for resiliently urging said shoes into contacting engagement, said sleeve having floating support upon said shoes.

13. In combination, a first insulating supporting member, a contact terminal mounted thereon and projecting from one surface thereof, a second insulating supporting member extending parallel to and spaced from said first supporting member, said second member having an enlarged opening substantially in alignment with said terminal and adapted to receive a projecting male contact plug, and means for establishing connection between said plug and said terminal comprising a pair of contact shoes, a sleeve of less axial length than the space between said supporting members enclosing said shoes, means biased against the interior lateral surface of said sleeve for urging said shoes into contacting engagement between said plug and terminal, and means at one end of said shoes providing for universal movement of said shoes and sleeve about said terminal.

14. An electrical connector comprising, in combination, a first contact member having a convex spherical contact portion, a plurality of contact shoes each having at one end a concave spherical contact portion for contact engagement with said convex spherical contact portion and having at the other end a concave cylindrical contact portion for contact engagement with the convex spherical contact portion of a second contact member, and resilient means biasing said contact shoes into contact engagement with the spherical contact portions of said first and second contact members.

15. An electrical connector comprising, in combination, a first contact member having a convex spherical contact portion, a plurality of contact shoes each having at one end a concave spherical contact portion for contact engagement with said convex spherical contact portion and having at the other end a concave cylindrical contact portion for contact engagement with the convex spherical contact portion of a second contact member, support means encircling said contact shoes, and resilient means acting between said support means and said contact shoes for biasing them into contact engagement with the spherical contact portions of said first and second contact members.

16. An electrical connector comprising, in combination, a first contact member having a convex spherical contact portion, a plurality of contact shoes, each having at one end a concave spherical contact portion for contact engagement with said convex spherical contact portion and having at the other end a concave cylindrical contact portion for contact engagement with the convex spherical contact portion of a second contact member, support means encircling said contact shoes, and resilient means individual to each of said contact shoes and acting between said support means and said contact shoes for individually biasing them into contact engagement with the spherical contact portions of said first and second contact members.

17. An electrical connector comprising, in combination, a first contact member having a convex spherical contact portion, a plurality of contact shoes each having at one end a concave spherical contact portion for contact engagement with said convex spherical contact portion and having at the other end a concave cylindrical contact portion for contact engagement with the convex spherical contact portion of a second contact member, support means encircling said contact shoes, resilient means individual to each of said contact shoes and acting between said support means and said contact shoes for individually biasing them into contact engagement with the spherical contact portions of said first and second contact members, and means on each of said contact shoes for centering said resilient means thereon.

18. An electrical connector comprising, in combination, a pair of spaced apart contact members having convex spherical contact portions, a plurality of contact shoes arranged and adapted to interconnect said contact members by contact engagement with said convex spherical contact portions thereof, support means encircling said contact shoes, and resilient means acting between said support means and said contact shoes for biasing them into contact engagement with said convex spherical contact portions of said contact members.

19. An electrical connector comprising, in combination, a pair of spaced apart contact members having convex spherical contact portions, a plurality of contact shoes arranged and adapted to interconnect said contact members by contact engagement with said convex spherical contact portions thereof, support means encircling said contact shoes, and resilient means individual to each of said contact shoes and acting between said support means and said contact shoes for individually biasing them into contact engagement with said convex spherical contact portions of said contact members.

20. An electrical connector comprising, in combination, a pair of spaced apart contact members having convex spherical contact portions, a plurality of contact shoes arranged and adapted to interconnect said contact members by contact engagement with said convex spherical contact portions thereof, means preventing detachment of said contact shoes from one of said contact members, said contact shoes being readily detachable from the other of said contact members, support means encircling said contact shoes, and resilient means individual to each of said contact shoes and acting between said support means and said contact shoes for individually biasing them into contact engagement with said convex spherical contact portions of said contact members.

21. An electrical connector comprising, in combination, a pair of spaced apart contact members having convex spherical contact portions, a plurality of contact shoes arranged and adapted to interconnect said contact members by contact engagement with said convex spherical contact portions thereof, means preventing detachment of said contact shoes from one of said contact members, said contact shoes being readily detachable from the other of said contact members, support means encircling said contact shoes, resilient means individual to each of said contact shoes and acting between said support means and said contact shoes for individually biasing them into contact engagement with said convex spherical contact portions of said contact members, and means on each of said contact shoes for centering said resilient means thereon.

CHARLES H. KOEHLER.